Figure 1:
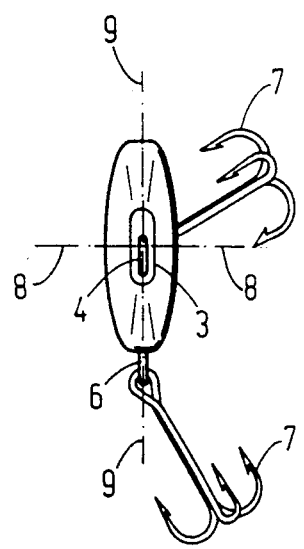

United States Patent [19]

Andersen

[11] Patent Number: 5,058,310
[45] Date of Patent: Oct. 22, 1991

[54] FISHING LURE

[76] Inventor: Kent Andersen, Havnegade 100, Odense C, Denmark, 5000

[21] Appl. No.: 415,883

[22] Filed: Oct. 2, 1989

[30] Foreign Application Priority Data

Sep. 30, 1988 [DK] Denmark .............................. 5452/88

[51] Int. Cl.$^5$ ............................................ A01K 85/00
[52] U.S. Cl. .................................. 43/42.15; 43/42.09
[58] Field of Search ................. 43/42.11, 42.15, 42.09, 43/42.35, 42.45

[56] References Cited

U.S. PATENT DOCUMENTS

| | | | |
|---|---|---|---|
| 966,068 | 8/1910 | Williamson | 43/42.15 |
| 974,050 | 10/1910 | Garrison | 43/42.15 |
| 1,581,833 | 4/1926 | Bonnett | 43/42.15 |
| 2,037,310 | 4/1936 | Bryan | 43/42.09 |
| 2,685,145 | 8/1954 | Dean | 43/42.15 |
| 3,165,857 | 1/1965 | Koziba | 43/42.15 |
| 3,367,059 | 2/1968 | Puls | 43/42.09 |
| 3,423,868 | 1/1969 | LeMaster | 43/42.15 |
| 4,176,490 | 12/1979 | Philips | 43/42.15 |
| 4,916,849 | 4/1990 | Radtchenko | 43/42.45 |

FOREIGN PATENT DOCUMENTS

| | | |
|---|---|---|
| 71387 | 5/1945 | Norway . |
| 86740 | 5/1954 | Norway . |
| 67374 | 5/1929 | Sweden .............................. 43/42.15 |

*Primary Examiner*—Kurt Rowan
*Attorney, Agent, or Firm*—Darby & Darby

[57] ABSTRACT

In order to increase the take by a two-piece hinged fishing lure, each section (1) according to the invention is identical and has a cross sectional shape being oval and substantially symmetrical around the horizontal (8) as well as the vertical (9) center plane in such a manner that it describes a smooth line toward the pointed end (3). The height of the section (1) is more than twice the width.

Provided with hooks this lure will during trolling have a motion pattern which is very much like that of a natural fish in that the body of the lure will move vividly in the water having the rear section wagging from side to side in calm motions without producing any noise at all in the water.

9 Claims, 1 Drawing Sheet

FISHING LURE

The invention relates to fishing lure whose body comprises two sections being hinged so as to be able to turn vertically and having an eye at either end of the body for line attachment and hook attachment, respectively.

In connection with trolling many types of artificial bait provided with hooks are being used. One of the most popular is a fishing lure which during trolling creates the illusion of a fish, i.e. a prey.

Fishing lures are known in many embodiments.

A fishing lure is known from U.S. Pat. No. 4,176,490 whose body consists of a front and a rear section being hinged together. A downwardly inclined plate is attached to the front section which during trolling will make the sections move back and forth in a wagging motion simulating the movements of a fish. Moreover, the frontmost section has larger buoyancy than the rear section in order for the lure to be able to slant in the water simulating a dying fish and thus an easier prey.

Such a lure has several drawbacks. First of all, the movements of the sections in the water are not natural in that they cannot be brought to look like the swimming motions of a fish due to the disturbance created in the water by the comparatively small plate. Add to this that it produces an unnatural noise in the water which many fishermen consider to be inexpedient.

Finally, as already mentioned, it is constructed of two different sections in order to be able to slant in the water.

Moreover, NO Pat. No. 86,740 relates to a lure whose body is also made of a front and a rear section. The rear section simulates the tail fin of a fish which fin can move freely from side to side during the trolling. This section will, however, at only a low trolling speed flutter at great speed from side to side which is not particularly fish-like and which furthermore produces a humming noise in the water.

It is the object of the invention to overcome these shortcomings and disadvantages of the known lures, and this is obtained by a two-piece lure, where each section has a cross sectional shape partly being oval and substantially symmetrical around the horizontal as well as the vertical centre plane and partly decreasing in size from the end of the hinge to the end of the eye.

Hereby is obtained a hitherto unknown fish-like motion in the water during the trolling in that the streamlined body reduces turbulence in the water in such a manner that the motions of the body remain calm and natural. Moreover, the calm motion in the water is silent. Tests have shown that this movement pattern is so much like that of a fish that the luring effect of the lure is surprisingly high and covers a large area in the water. This permits fishing over a considerably larger area of water per trolling than by hitherto known lures.

By making the two sections identical, as mentioned in claim 2, the production costs can be reduced proportionally while at the same obtaining symmetry around the hinge providing a calm motion.

By making the height of the sections comparatively large compared with the width the motions and the appearance of the body will become very much like that of a fish.

Finally, it is expedient to produce the sections of plastics having a density slightly above that of water in that the lure having been provided with hooks will float high up in the water corresponding to the pattern of a pelagic fish.

Figure 2:
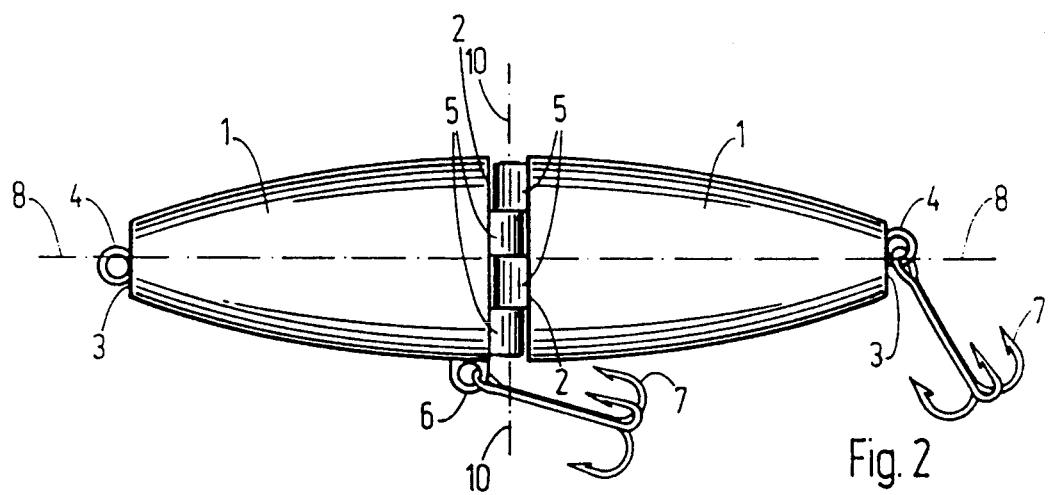
Figure 3:
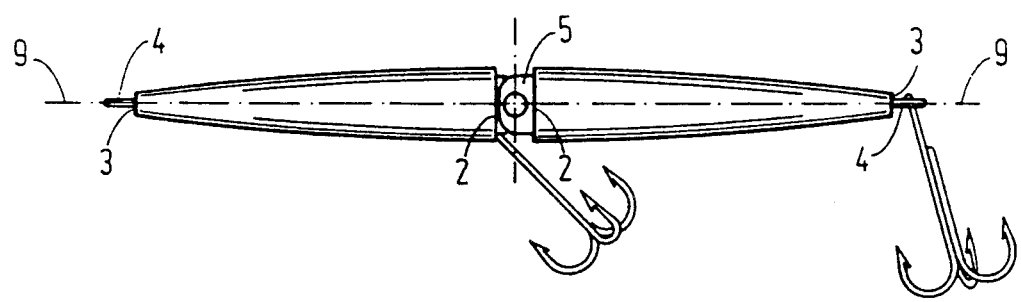

In the following the invention will be described in closer detail with reference to the drawing, in which FIG. 1 is a front view of a lure according to the invention provided with hooks, FIG. 2 is a side view of the lure, and FIG. 3 is a top view of the lure.

The drawing shows an example of a preferred embodiment of a lure according to the invention whose body consists of two sections 1 being hinged together.

The section 1 is preferably made by molding plastics having a density being slightly above one.

The section 1 has a pointed end 3, as shown in FIGS. 2 and 3, and the shape widens from the pointed end 3 to an end face 2 which is provided with pivots 5.

The cross sectionsl shape is entirely oval and so that the height of the section is at least twice the width. The shape describes a smooth line from the end face 2 to the pointed end 3, and there is symmetry around the horizontal 8 as well as the vertical centre plane 9.

This produces a streamlined shape which gives the lure a low flow resistance through the water and makes it appear very fish-like.

In the pointed end 3 a lug is screwed in or an eye 4 is moulded.

Two pivots 5 are moulded on each hinge end 2, which pivots are separated heightwise and are staggered in order that two sections can be joined when one section is turned 180° relative to the other section, as shown in FIG. 2.

The pivots 5 have a through-bore so that a pintle can be inserted through the pivots 5 and create the finished hinge which permits the sections to be turned around the axis of rotation 10 of the hinge. The pivots 5 are interengaged and overlapped each with an adjacent pivot or pivots.

A hook 7 can be attached to the one eye 4, which hook in the shown example is a three-legged hook, and a lug 6 can be screwed in at the bottom side of the other section in which a further hook 7 can be attached. This latter hook 7 will serve as ballast and keep the body oriented during use in the water in order for the height to remain vertically 9 oriented.

In the front eye 4 a line (not shown) can be attached.

In order to give the body a vivid appearance, the sections can be painted and one section provided with eyes whereby the lure will appear very vivid.

Once the lure is thrown out, it will begin to sink and position itself with the lower hook 7 pointing downwards.

During trolling the rear section with the hook 7 will move from side to side around the hinge axis 10 making calm and homogenous motions quite similar to those of a live fish.

During the entire trolling, the hooks will be freely accessible in that the sections will not stand in the way when the fish bites, which ensures that the fish is caught properly on the hook.

I claim:

1. A fishing lure suggestive of a fish, comprising:
a body having a length, width and height generally corresponding to the profile of a fish and including a first section and a second section, said sections being joined to each order to comprise a hinge having a pivot axis, the hinge axis bisecting said body and extending in the height directions, said body being substantially symmetrical to a first plane in which that hinge axis lies, said body sections being identical, said first plane extending in the height and width directions, said body being substantially symmetrical to a second plane perpendicular to said axis and passing through the axis midpoint, said second plane extending in the length and width directions, the height of said sections diminishing as the distance from said axis increases, each said identical body section includes similar elements for one side of said hinge, said elements on each said body section being spaced apart, elements of one said body section nesting between the elements of the other said body section, each said element having a bore therethrough, said bores being aligned when said elements are nested, and a pintle extending through said aligned bores to complete said hinge with overlap of said hinge elements.

2. A fishing lure as in claim 1, wherein said body is substantially symmetrical to a third plane extending in the length and height direction, said axis lying in said third plane.

3. A fishing lure as in claim 1, wherein cross sections of said body, in height/width planes, are substantially oval.

4. A fishing lure as in claim 2, wherein cross sections of said body, in height/width planes, are substantially oval.

5. A fishing lure as in claim 2, wherein the height of said body sections is everywhere more than twice the width.

6. A fishing lure as in claim 4, wherein the height of said body sections is everywhere more than twice the width.

7. A fishing lure as in claim 1, wherein said body has a density slightly above 1.0.

8. A fishing lure as in claim 2, wherein said body has a density slightly above 1.0.

9. A fishing lure as in claim 3, wherein said body has a density slightly above 1.0.

* * * * *